UNITED STATES PATENT OFFICE.

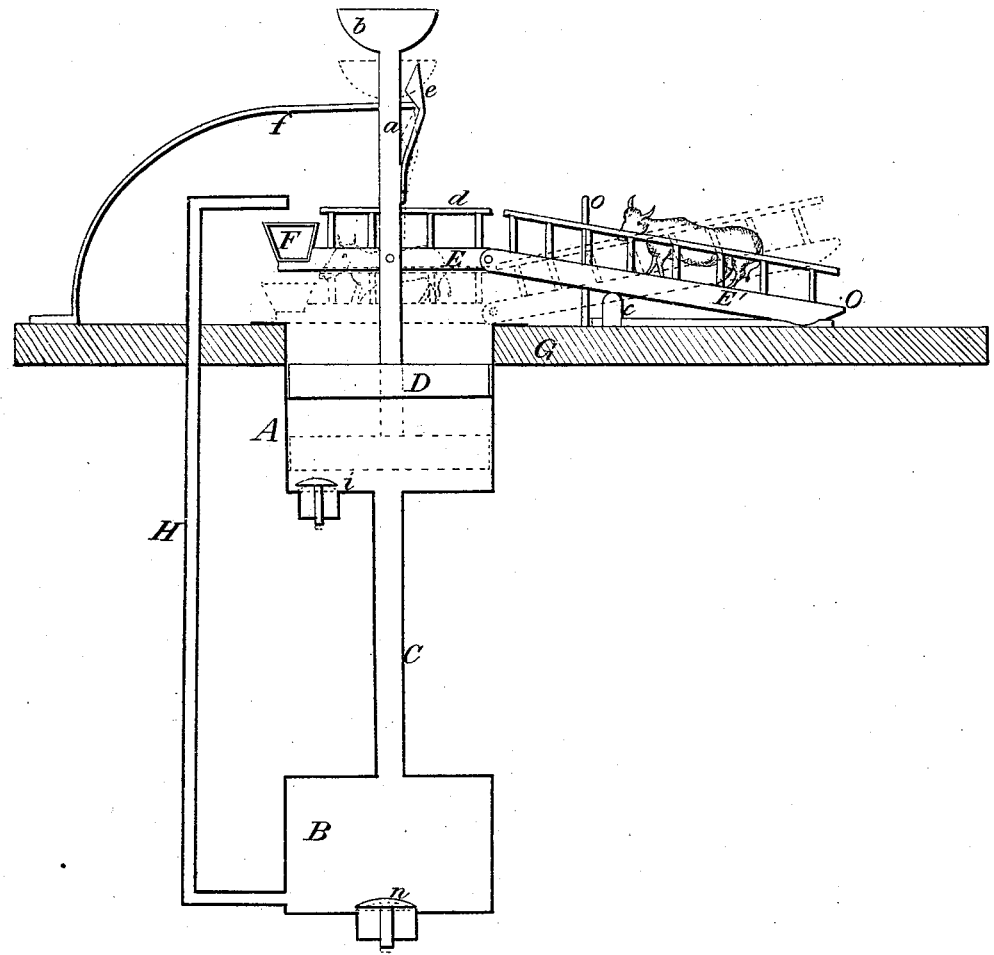

JOHN B. ATWATER, OF CHICAGO, ILLINOIS.

IMPROVEMENT IN CATTLE-PUMPS.

Specification forming part of Letters Patent No. 44,274, dated September 20, 1864.

*To all whom it may concern:*

Be it known that I, JOHN B. ATWATER, of Chicago, Cook county, Illinois, have invented certain new and useful improvements in a pumping apparatus by which cattle are enabled to elevate the water necessary for their use; and I do hereby declare that the following is a full, clear, and exact description of the same, reference being had to the accompanying drawing, and to the letters of reference marked thereon, making a part of this specification, and in which drawing my invention is shown in vertical section.

The nature of my invention consists in elevating water by means of a piston forcing air down into a suitable reservoir and by displacing the water therein forcing the same up a spout, said piston being operated by the combined action of a weight applied thereto and of the animal to be supplied with the water.

To enable others skilled in the art to construct and use my invention, I will proceed to describe it.

A and B each represent a cylinder, the former of which is open at the top, the latter being closed. These cylinders are connected by a tube, C, as clearly shown in the drawing. The cylinder B is provided with a valve, n, opening inward, as shown, and has attached to it a discharge-pipe, H, leading to the point where the water is to be delivered. The cylinder A is provided with a valve, i, opening inward, similar to that of B. It has also a piston, D, fitted to operate in it, air-tight. To this piston D is secured a stem or rod, a, extending upward, and having its upper portion working in a suitable bearing in the support f, or its equivalent, for the purpose of retaining it in its position and guiding it in its movements. This stem or rod a is provided with a box, b, for the purpose of having a weight placed therein for a purpose to be hereinafter explained. A jointed platform, consisting of the two parts E and E', is fulcrumed or pivoted upon the bearing c in such a position as to be nearly balanced thereon. The front part, E, of this platform is securely connected to the piston-rod a, and at its outer end and directly underneath the mouth of the discharge-pipe H is placed a trough, F, for receiving the water discharged therefrom.

Attached to the piston-rod a is a spring-catch, e, which engages with the support f or any other suitable portion of the frame, and thereby retains the piston D and its stem in its elevated position, as shown.

The platform E and E' is provided with a suitable railing, d, which extends along both sides, so as to compel the cattle to enter and leave the same at O, the opposite end being closed by the trough F, and, if necessary, by an additional railing. A stake, o, is placed on each side of the platform, near the support c, for the purpose of keeping the platform in position.

G represents the plank or framing over the mouth of the well or reservoir from which the water is to be elevated, and upon which the tilting platform is located and to which the pumping apparatus is also secured.

The operation of my device is a follows: The lower cylinder is immersed in the water to the line x x, or to any depth that shall insure the immersion of cylinder B, and yet not permit the water to reach the valve i in cylinder A. The piston, being elevated, throws the outer end, O, of the tilting platform down in contact with the ground, when the animal desiring to drink advances upon the platform to the trough F. As it thus advances and reaches the end of the platform near the trough its weight causes the platform to tilt on the fulcrum c, as indicated in red, and as this platform is connected to the piston-rod a, it follows that the piston D will be thereby forced down in cylinder A, as indicated in red, thereby forcing the air contained in cylinder A down through tube C into cylinder B, displacing the water therein, and forcing it up through discharge-pipe H into the trough F, where the animal can drink at its pleasure. As the platform is surrounded by a railing of sufficient height to prevent the animal from escaping at any other point than that at which it entered, it follows that, as the animal approaches the outer end, O, of the platform, its weight again tilts the same but in a reverse direction, thereby returning it and the piston D to their original position, in which position they are retained by the spring catch e until the operation is repeated by the entrance of another animal. It is obvious that by this means water may be elevated to a greater height than by the ordinary suction or lift-pump--this operating as a force-pump--and that the power or weight required to operate it will be proportioned to the depth from which the water is to be elevated.

To adjust the apparatus to work at different depths, the box $b$, on the upper end of piston-rod $a$, is provided with more or less weight, as may be found necessary, in conjunction with the weight of the animal, to operate the piston. By this means also the apparatus may be adjusted so as to be operated by smaller animals—such as calves or sheep—the weight in box $b$ being increased to compensate for the decreased weight of the animal, the fulcrum-point $c$ being in that case placed nearer to the piston, in order that the increased leverage of the outer end, O, of the platform shall enable the smaller animal to return the piston and platform to their original position. It will be seen that as soon as the pressure is removed from the water in cylinder B the water standing in discharge-pipe H will at once flow back into the cylinder, whereby all freezing and injury of said pipe is effectually prevented, and this is a most important and necessary feature in all apparatus of this kind intended to be operated by the animal in the field, where no person is expected to be present, to attend to it. The valve $n$ is simply to permit the cylinder B to be refilled in the usual manner when the pressure is removed therefrom. Valve $i$ may not be absolutely necessary and is only provided and intended to admit a supply of air to the cylinder A in case any portion of the same shall have worked past the piston-head D and escape. It is obvious that the same results may be produced without the use of any air-chamber by applying the piston-head D directly upon the surface of the water in cylinder D or tube C, which latter, in that case, would be enlarged in size. The use of the air-chamber is however preferred for this reason, that, when the platform is tilted, the piston is forced down almost at once, and as the water in B cannot be instantaneously forced through the small pipe H, it follows that the air forced down by the piston will be more or less condensed, and by its expansion thereafter the water will be forced in a regular and continuous stream out of pipe H so long as the expanding air shall exert a pressure equal to the weight of the water to be elevated. By these means there is less strain and shock upon the parts, and their liability to injury will be thereby decreased, and their durability proportionably increased.

Having thus fully described the construction and operation of my invention, what I claim, and desire to secure by Letters Patent, is—

1. The apparatus, consisting of the cylinder A and B, connected by the pipe C, and provided with the discharge-pipe H, operating in combination with the piston D, provided with stem $a$ and box $b$, or its equivalent.

2. In combination with the foregoing, I claim regulating and adapting the apparatus to be operated by animals of various weights by means of weights applied to the box $b$, substantially as specified.

3. Securing and holding the piston D and tilting platform in position by means of the spring-catch $e$, or its equivalent.

J. B. ATWATER.

Witnesses:
E. TRIPP,
E. HURD.